United States Patent
Konagai et al.

(10) Patent No.: US 12,073,518 B2
(45) Date of Patent: Aug. 27, 2024

(54) AUGMENTED REALITY ANNOUNCEMENT INFORMATION DELIVERY SYSTEM, AND ITS DELIVERY CONTROL APPARATUS, METHOD, AND PROGRAM

(71) Applicant: NIPPON TELEGRAPH AND TELEPHONE CORPORATION, Tokyo (JP)

(72) Inventors: Shunsuke Konagai, Musashino (JP); Hitoshi Seshimo, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/769,532

(22) PCT Filed: Nov. 1, 2019

(86) PCT No.: PCT/JP2019/043134
§ 371 (c)(1),
(2) Date: Apr. 15, 2022

(87) PCT Pub. No.: WO2021/084756
PCT Pub. Date: May 6, 2021

(65) Prior Publication Data
US 2024/0135652 A1 Apr. 25, 2024
US 2024/0233277 A9 Jul. 11, 2024

(51) Int. Cl.
*G06T 19/00* (2011.01)

(52) U.S. Cl.
CPC .................. *G06T 19/006* (2013.01)

(58) Field of Classification Search
None
See application file for complete search history.

(56) References Cited

PUBLICATIONS

Hirokazu Kato et al., An Augmented Reality System and its Calibration based on Marker Tracking, Journal of the Virtual Reality Society of Japan, vol. 4, No. 4, 1999.

*Primary Examiner* — Robert J Craddock
(74) *Attorney, Agent, or Firm* — Harness, Dickey & Pierce, P.L.C.

(57) ABSTRACT

A delivery control device generates a recognition index on a notification space basis, the recognition index used to recognize the notification space, displays the recognition index in the notification space, and stores the recognition index in management information. The delivery control device instead stores an image characteristic extracted from a content to be displayed in the notification space as the recognition index in the management information. In this state, the delivery control device selects a notification space viewable on the augmented reality display terminal based on information on the position of the augmented reality display terminal held by a user and information on the position of the notification space and transmits the recognition index corresponding to the selected notification space and a notification content to the augmented reality display terminal. In response to the above, the augmented reality display terminal extracts the recognition index from the captured real-life video images and superposes the notification content in the position corresponding to the extracted recognition index in the real-life video images to generate and display augmented reality notification video images.

16 Claims, 11 Drawing Sheets

AUGMENTED REALITY ANNOUNCEMENT INFORMATION DELIVERY SYSTEM, AND ITS DELIVERY CONTROL APPARATUS, METHOD, AND PROGRAM

CROSS-REFERENCE TO RELATED APPLICATIONS

This application is a 371 U.S. National Phase of International Application No. PCT/JP2019/043134, filed on Nov. 1, 2019. The entire disclosure of the above application is incorporated herein by reference.

TECHNICAL FIELD

An embodiment of the present invention relates to an augmented reality notification information delivery system, a device therefor, a method, and a program for displaying notification information, such as an advertisement, in the real world, for example, by using an augmented reality (AR) technology.

BACKGROUND ART

In recent years, there has been a practically used augmented reality display device that superposes computer graphics on real-life video images viewed by a user through a smartphone or a transmissive or camera-through head mounted display and displays the resultant video images (see Non-Patent Literature, for example 1).

Using such an augmented reality display device and measuring the position and orientation of the display device provides visual information that allows a user to feel as if a virtual object that does not exist in reality existed on the real world. Furthermore, direct communication or indirect communication via a central device among a plurality of augmented reality display devices allows a plurality of users to feel that the same virtual object exists at the same location.

In a system that distributes a content over the Internet, there is a popular scheme for attaching web advertisements to the content so that users can use the content without paying any fee to the content deliverer. In a system of this type, for example, a content containing advertisements is generated and saved in an HTTP server, and the content with the advertisements is downloaded from the HTTP server to a user terminal when the user terminal accesses the URL where the content with the advertisements is saved.

CITATION LIST

Non-Patent Literature

Non-Patent Literature 1: "An Augmented Reality System and its Calibration based on Marker Tracking", Hirokazu Kato, Mark Billinghurst, Koichi Asano, Keihachiro Tachibana, Transactions of the Virtual Reality Society of Japan, 1999, Vol. 4, No. 4, pp. 607-616

SUMMARY OF THE INVENTION

Technical Problem

In an attempt to display advertisements in the real world by applying augmented reality, however, address and content description systems, such as systems using URL and HTML used in the aforementioned system that delivers a content with advertisements over the Internet, cannot specify a real world location where the advertisements are displayed. To solve the problem, for example, there has been a proposed approach for extracting a local feature, such as SIFT and SURF as representative examples, as a key from natural video images, such as video images of real world scenery, and displaying advertisements in a position in the natural video images where the local feature is extracted.

Such an approach, however, requires the process of extracting a local feature from natural video images of the real world and selecting a corresponding advertisement by comparing the extracted local feature with a huge number of candidates. The processing load on the device that carries out the process described above is therefore very large.

The present invention has been made in view of the circumstances described above and provides a technology for displaying notification information, such as an advertisement, in natural video images in the real world while suppressing the processing load on the device.

Means for Solving the Problem

To achieve the object described above, an aspect of an augmented reality notification information delivery system according to the present invention includes an augmented reality display terminal held by a user and a delivery control device capable of communicating with the augmented reality display terminal. The delivery control device includes a storage medium that stores management information containing at least information on a position of a notification space where a recognition index representing a notification information display target portion is displayed and index information representing the recognition index, a determination unit that determines, based on information on a position of the augmented reality display terminal and the notification space position information contained in the management information, whether or not the augmented reality display terminal is so located that the notification space falls within a field of view of the augmented reality display terminal, and a transmission unit that transmits delivery information containing the notification information and the index information contained in the management information to the augmented reality display terminal with the augmented reality display terminal being determined to be so located that the notification space falls within the field of view of the augmented reality display terminal. The augmented reality display terminal includes an acquisition unit that acquires video images of a real world that falls within the field of view of the augmented reality display terminal, a receipt unit that receives the delivery information transmitted from the notification information delivery control device, an extraction unit that extracts the recognition index corresponding to the index information contained in the received delivery information from the acquired real world video images, and an augmented reality video image generation unit that displays the notification information contained in the delivery information on a display unit of the augmented reality display terminal in such a way that the notification information is superposed in a position where the recognition index in the acquired real world video images is extracted.

Effects of the Invention

The aspect of the prevent invention can provide a technology that allows notification information, such as advertisements, to be displayed in real world video images while suppressing the processing load on the device.

DESCRIPTION OF EMBODIMENTS

An embodiment according to the present invention will be described below with reference to the drawings.

EMBODIMENT

Configuration Example (1) System

Figure 1:
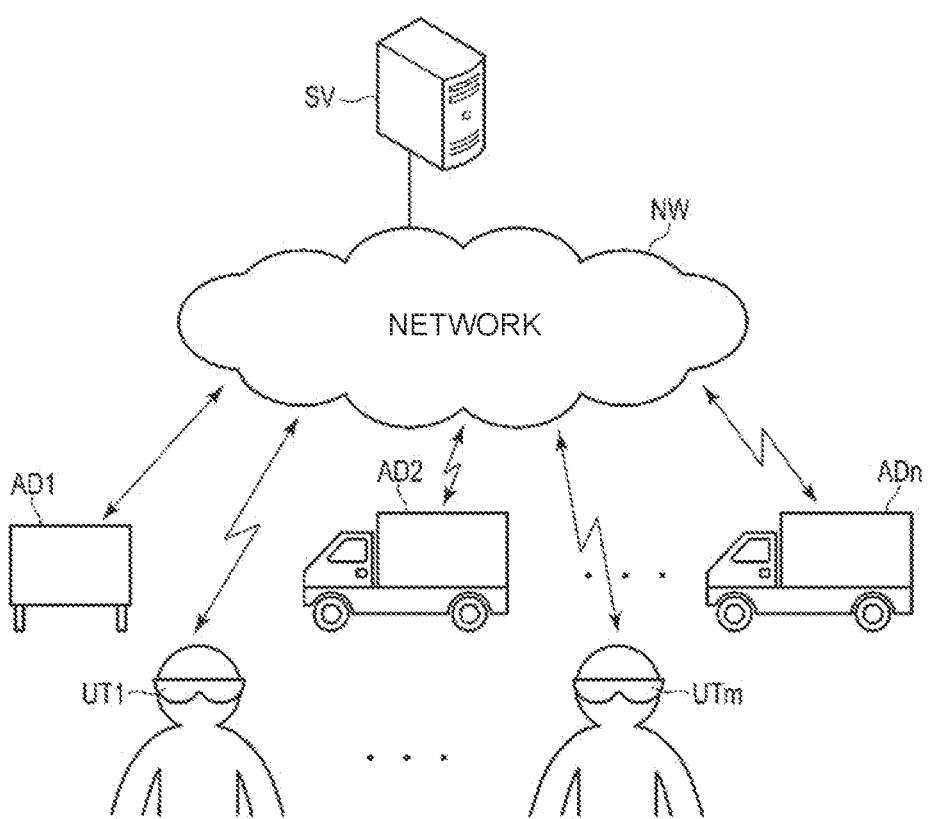
FIG. 1 shows the overall configuration of an augmented reality notification information delivery system according to an embodiment of the present invention.

FIG. 1 shows the overall configuration of an augmented reality notification information delivery system according to an embodiment of the present invention. The augmented reality notification information delivery system includes an advertisement delivery server SV, which operates as a notification information delivery control device. Information communication can be performed between the advertisement delivery server SV and a plurality of advertisement spaces AD1 to ADn as notification spaces and between the advertisement delivery server SV and augmented reality display terminals (hereinafter referred to as AR display terminals) UT1 to UTm held by users via a network NW including the Internet.

The network NW includes at least one of wired and wireless public networks, wired and wireless LANs (local area networks), CATV (cable television) networks, and wireless networks employing low-power wireless data communication standards, such as Bluetooth (registered trademark), as a network for accessing a WAN (wide area network), such as the Internet.

(2) Device (2-1) Advertisement Space AD1 to ADn

The advertisement spaces AD1 to ADn are provided, for example, at billboards and truck bodies. The advertisement spaces AD1 to ADn each include a projection device, such as a display or a projector.

The advertisement spaces AD1 to ADn each further include a position sensor that measures the position of the advertisement space and a communication unit that communicates with the advertisement delivery server SV. The position sensor is, for example, a sensor that calculates the position thereof by using GPS (global positioning system) signals transmitted from GPS satellites or control signals transmitted by a base station of a mobile communication system or a geomagnetism sensor. The position sensor may also have, for example, the function of detecting the display direction of the advertisement space by using a gyro sensor. The communication unit transmits information on the position (including display direction) measured with the position sensor described above to the advertisement delivery server SV.

An immobile advertisement space that is installed in a fixed position, such as a billboard, may not be provided with the function of transmitting the information on the position measured with the position sensor described above.

(2-2) Advertisement Delivery Server SV

Figure 2:
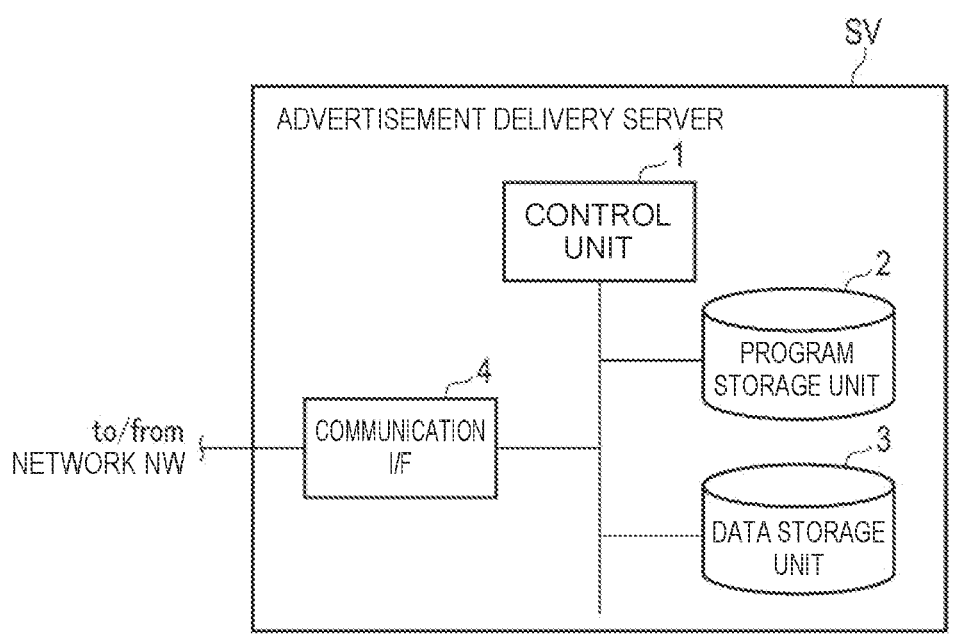
FIG. 2 is a block diagram showing the hardware configuration of an advertisement delivery server that operates as a delivery control device in the system shown in FIG. 1.
Figure 3:
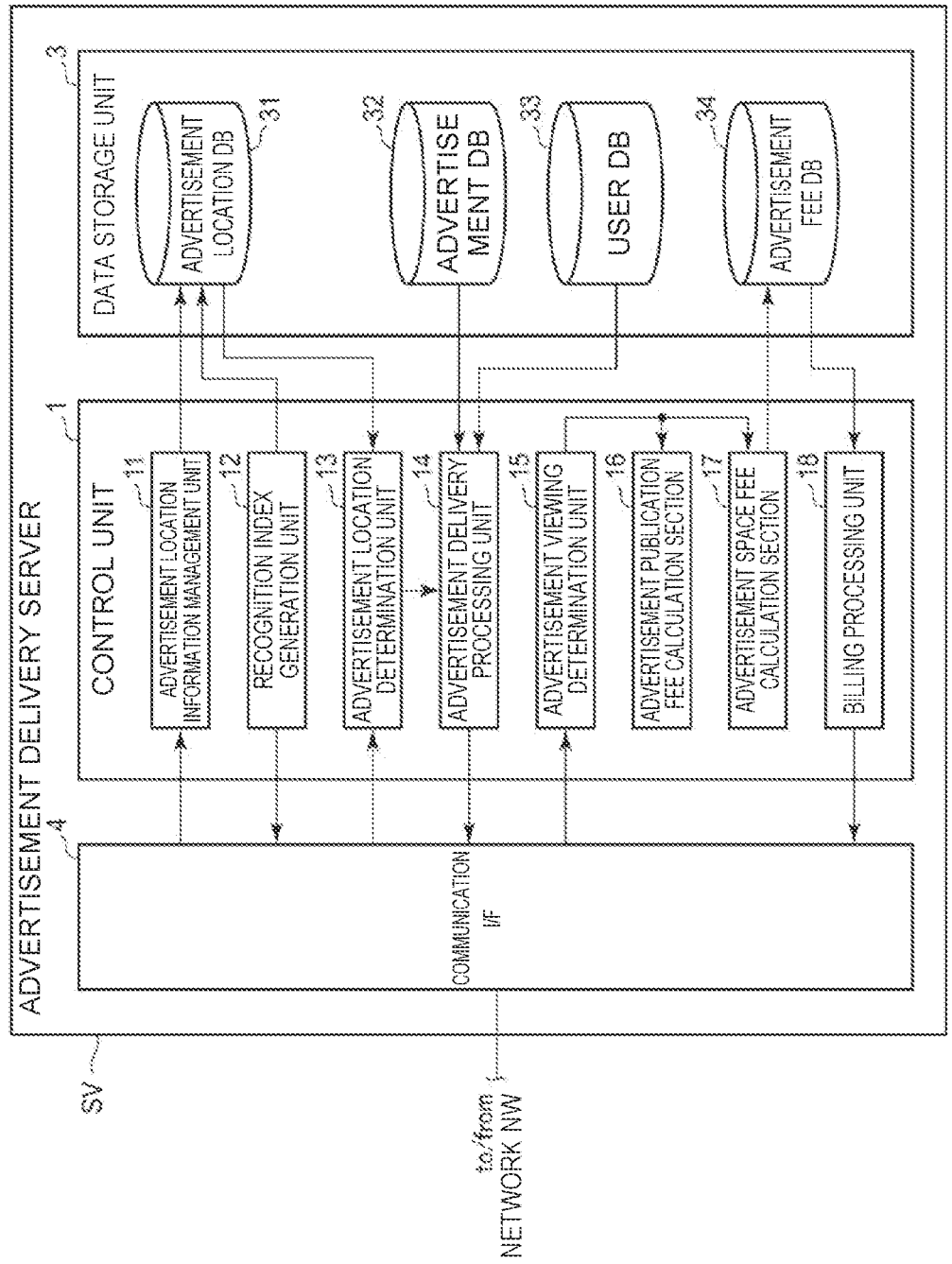
FIG. 3 is a block diagram showing the software configuration of the advertisement delivery server that operates as the delivery control device in the system shown in FIG. 1.

FIGS. 2 and 3 are block diagrams showing the hardware and software configurations of the advertisement delivery server SV, respectively.

The advertisement delivery server SV includes a control unit 1 including a hardware processor, such as a central processing unit (CPU), and a program storage unit 2, a data storage unit 3, and a communication interface (communication I/F) 4 are connected to the control unit 1 via a bus.

The program storage unit 2 includes, for example, an any-time writable, readable nonvolatile memory, such as a hard disk drive (HDD) or a solid state drive (SSD), as a main storage medium, and the storage area of the program storage unit 2 stores programs necessary for carrying out a variety of control processes according to the embodiment of the present invention in addition to middleware, such as an operating system (OS). The storage medium may be a combination of the HDD or the SSD described above and a ROM (read only memory).

The data storage unit 3 is a combination of the HDD or the SSD and a RAM (random access memory). The storage area of the data storage unit 3 is provided with an advertisement location database (advertisement location DB) 31, an advertisement database (advertisement DB) 32, a user database (user DB) 33, and an advertisement fee database (advertisement fee DB) 34, which are used in the embodiment of the present invention.

For each of the advertisement spaces AD1 to ADn described above, the advertisement location DB 31 stores the following information in association with identification information used to identify the advertisement space (advertisement location ID): information on the location and attributes of the advertisement space; and information representing a recognition index used to recognize the advertisement space.

The information on the attributes of an advertisement space is a multi-dimensional vector used, for example, in marketing (the number of passers-by per unit time and the average of the attributes of the passers-by, for example). The information on the attributes of an advertisement location may each have a fixed value or may instead each have a plurality of values in accordance with the position to which the advertisement space is moved, the season, and the time of day. Generation and storage of the information on the attributes of an advertisement space can be automatically performed by the advertisement delivery server SV using a dedicated application and can instead be manually performed by an operator.

The advertisement DB 32 stores a large number of advertisement contents to be delivered along with the information on the attributes thereof. The information on the attributes of an advertisement content contains, for example, information representing a suitable location as the delivery destination and attributes of suitable users as the delivery target.

The user DB 33 stores user attribute information associated with the identification information (user ID) used to identify each pre-registered users to be serviced. The user attribute information contains, for example, the user's age, gender, occupation, hobbies, and preferences.

The advertisement fee DB 34 is used to store information representing an advertisement fee calculated by the control unit 1. The advertisement fee includes an advertisement publication fee paid by an advertiser to an advertisement deliverer and an advertisement space fee paid by the advertisement deliverer to an advertisement space owner.

The communication I/F 4 transmits and receives a variety of types of information to and from the advertisement spaces AD1 to ADn and the AR display terminals UT1 to UTm described above via the network NW under the control of the control unit 1. The communication I/F 4 is, for example, an interface for a wired network.

The control unit 1 includes the following processing functions according to the embodiment of the present invention: an advertisement location information management unit 11; a recognition index generation unit 12; an advertisement location determination unit 13; an advertisement delivery processing unit 14; an advertisement viewing determination unit 15; an advertisement publication fee calculation unit 16; an advertisement space fee calculation unit 17; and a billing processing unit 18. The processing units 11 to 18 are all achieved by causing the hardware processor to execute the programs stored in the program storage unit 2.

The advertisement location information management unit 11 receives via the communication I/F 4 the advertisement space position information sent regularly or at an arbitrary timing from the advertisement spaces AD1 to ADn. Whenever the position information is received, the advertisement location information management unit 11 associates the received position information with the advertisement location IDs of the advertisement spaces AD1 to ADn and updates and stores the information in the advertisement location DB 31. At the same time, the advertisement location information management unit 11 generates the information on the attributes of the advertisement spaces based on the information on the positions of the advertisement spaces and stores the generated attribute information in the advertisement location DB 31 in association with the advertisement location IDs of the advertisement spaces AD1 to ADn described above.

For each of the advertisement spaces AD1 to ADn, the recognition index generation unit 12 regularly generates at a predetermined cycle the recognition index for recognizing an advertisement target portion of the advertisement space. The recognition index is formed, for example, of a two-dimensional barcode or a QR code (registered trademark) and may instead be a mark, a symbol, or an image other than the codes described above as long as the advertisement space can be recognized. The cycle of the generation of the recognition index is set at a relatively short period of time, for example, about one minute, to prevent scribblings on the advertisement space.

The recognition index generation unit 12 transmits the generated recognition index described above via the communication I/F 4 to the corresponding one of the advertisement spaces AD1 to ADn and also stores the recognition index in the advertisement location DB 31 in association with the advertisement location ID of the corresponding advertisement space. Each piece of information on advertisement spaces AD1 to ADn to be stored in the advertisement location DB 31 is referred to as management information.

The advertisement location determination unit 13 receives user's location information transmitted from any of the AR display terminals UT1 to UTm held by the users via the communication I/F 4. Based on the received user's location information and the information on the positions of the advertisement spaces AD1 to ADn stored in the advertisement location DB 31, the advertisement location determination unit 13 then selects an advertisement space that satisfies conditions that allow the user to view the advertisement space by using the AR display terminal. A specific example of the conditions that allow the viewing will be described later.

When the advertisement location determination unit 13 described above selects an advertisement space that satisfies the conditions that allow the viewing, the advertisement delivery processing unit 14 reads information on the attributes of the target user (first attribute information) from the user DB and further reads information on the attributes of the selected advertisement space (second attribute information) from the advertisement location DB 31. Based on the read user attribute information and advertisement space attribute information, the advertisement delivery processing unit 14 then selects an advertisement content that matches the user and the advertisement space described above from the advertisement DB 32. A specific example of the advertisement content search will also be described later.

The advertisement delivery processing unit 14 further reads the recognition index corresponding to the advertisement space at the delivery destination from the advertisement location DB 31 described above and generates advertisement delivery information containing the recognition index and the searched advertisement content described above. The advertisement delivery processing unit 14 then transmits the generated advertisement delivery information described above via the communication I/F 4 to the advertisement space at the delivery destination.

The advertisement viewing determination unit 15 receives viewing information transmitted from the AR display terminal at the delivery destination via the communication I/F 4 after the advertisement delivery processing unit 14 described above delivers the advertisement content. Based on the received viewing information, the advertisement viewing determination unit 15 then determines the extent to which the user has viewed the advertisement content described above. The extent of the user's viewing is determined, for example, based on the number of views of the advertisement or the number of views of the advertisement or the number of click actions (responses) to the advertisement.

The advertisement publication fee calculation unit 16 calculates the advertisement publication fee based on the result of the determination of the number of views of the advertisement content or the number responses thereto described above and stores the calculated advertisement publication fee described above in the advertisement fee DB in association with the identification ID of the advertisement content.

The advertisement space fee calculation unit 17 calculates the advertisement space fee based on the result of the determination of the number of views of the advertisement content or the number responses thereto described above and stores the calculated advertisement space fee described above in the advertisement fee DB in association with the identification ID of the advertisement content.

On a predetermined billing date, the billing processing unit 18 reads the advertisement publication fee and the advertisement space fee described above for a certain period of time from the advertisement fee DB for each billing destination, generates billing information, and transmits the generated billing information to the billing destination via the communication I/F 4.

(2-3) AR Display Terminals UT1 to UTm

Figure 4:
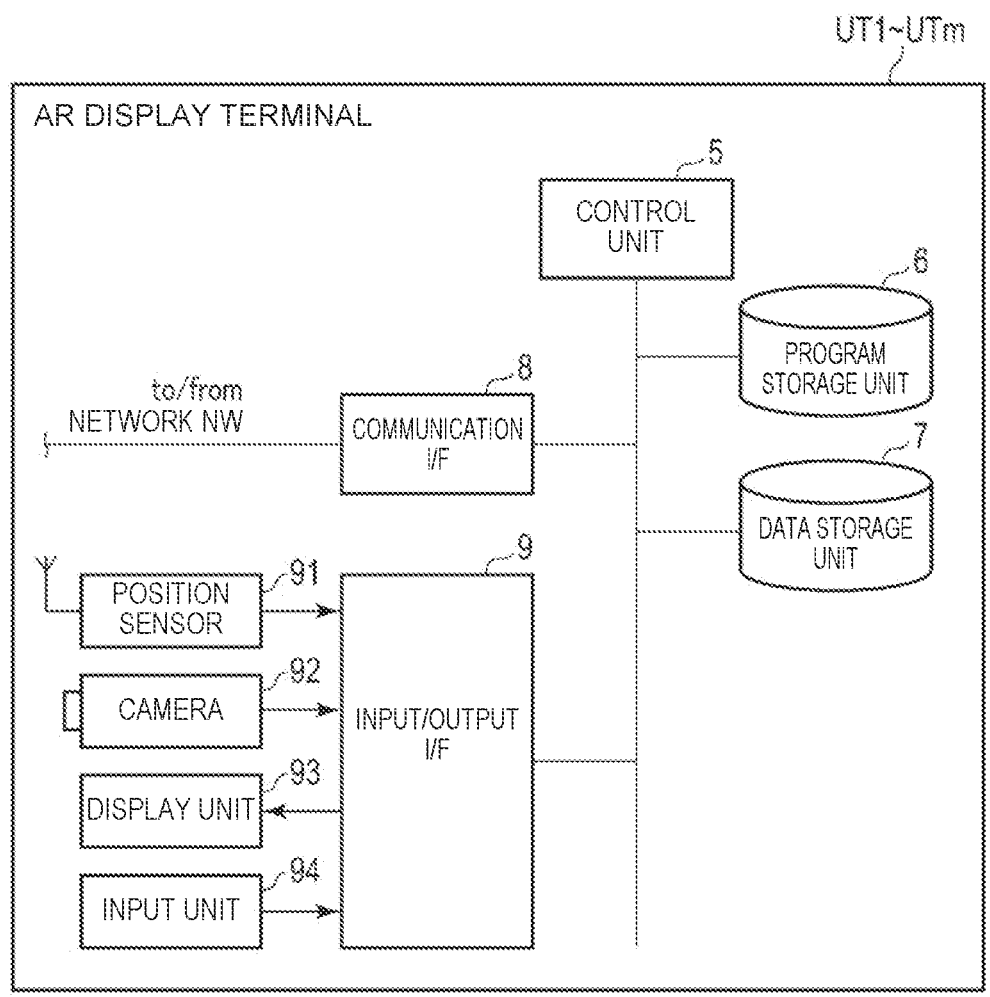
FIG. 4 is a block diagram showing the hardware software configuration of an AR display terminal that operates as an augmented reality display terminal in the system shown in FIG. 1.
Figure 5:
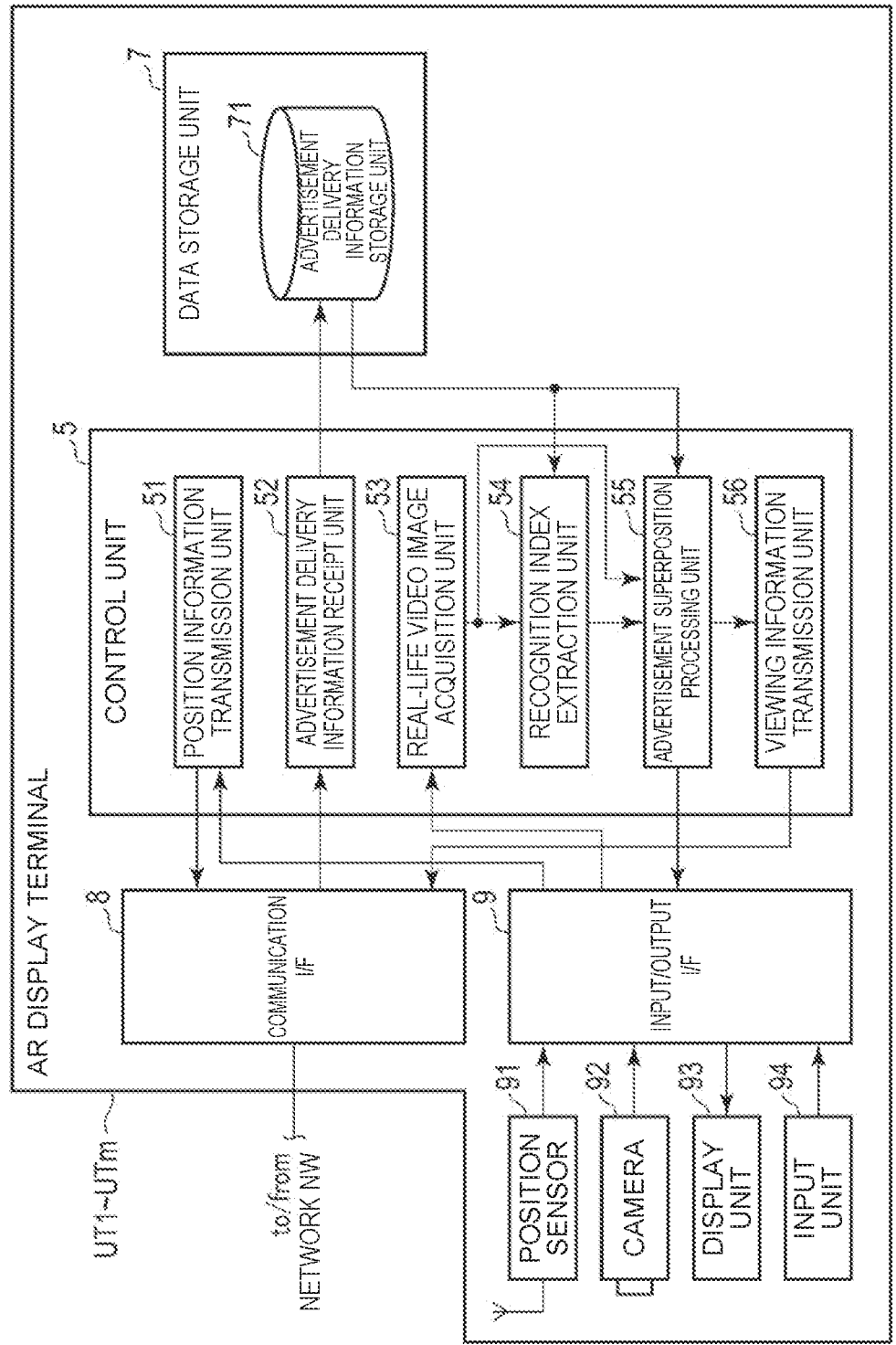
FIG. 5 is a block diagram showing the software configuration of the AR display terminal that operates as the augmented reality display terminal in the system shown in FIG. 1.

FIGS. 4 and 5 are block diagrams showing the hardware and software configurations of the AR display terminals UT1 to UTm, respectively.

The AR display terminals UT1 to UTm are each formed, for example, of a head mounted display (HMD). The HMD has, for example, the shape of a goggle and is detachably attached to the user's head. The HMD may have the shape of glasses instead of the shape of a goggle or may be a combination of a goggle or glasses and a mobile terminal, such as a smartphone.

The AR display terminals UT1 to UTm each include a control unit 5 including a hardware processor, such as a CPU, and a program storage unit 6, a data storage unit 7, a communication interface (communication I/F) 8, and an input/output interface (input/output I/F) 9 are connected to the control unit 5 via a bus.

The program storage unit 6 includes, for example, an any-time writable, readable nonvolatile memory, such as an SSD, as a main storage medium, and the storage area of the program storage unit 6 stores programs necessary for carrying out a variety of control processes according to the embodiment of the present invention in addition to middleware, such as an OS. The storage medium may be a combination of the SSD and a ROM.

The data storage unit 7 is a combination of the SSD and a RAM, and an advertisement delivery information storage unit 71, which is used in the embodiment of the present invention, is provided in the storage area of the data storage unit 7. The advertisement delivery information storage unit 71 is used to save the advertisement delivery information sent from the advertisement delivery server SV.

The communication I/F 8 performs information communication with the advertisement delivery server SV via the network NW under the control of the control unit 5.

A position sensor 91, a camera 92, a display unit 93, and an input unit 94 are connected to the input/output I/F 9. The position sensor 91 regularly measures the position of the corresponding one of the AR display terminals UT1 to UTm based, for example, on the GPS signals transmitted from the GPS satellites and control signals transmitted by the base station of the mobile communication system and outputs information on the measured position. The camera 92 captures video images of the real world in front of the user and outputs real-life video image data. The display unit 93 is formed, for example, of a transmissive display, and the transmissive display can display AR images of an advertisement content in the state in which the user looks at the advertisement space in the real world in front of the user. The input unit 94 includes operation buttons, switches, and other components and is used by the user to control the action of the corresponding one of the AR display terminals UT1 to UTm.

The AR display terminals UT1 to UTm may each include a motion sensor that detects the motion thereof. The motion sensor is formed, for example, of an angular velocity sensor (gyro sensor) and detects the direction in front of the corresponding one of the AR display terminals UT1 to UTm, that is, the direction of the user's line of sight. The AR display terminals UT1 to UTm may further each include sensors that detect the direction of the user's line of sight and the user's blinking action. The direction of the line of sight and the blinking action can be detected, for example, by capturing an image of the user's eyes with a camera and analyzing the image data.

The control unit 5 includes a position information transmission unit 51, an advertisement delivery information receipt unit 52, a real-life video image acquisition unit 53, a recognition index extraction unit 54, an advertisement superposition processing unit 55, and a viewing information transmission unit 56 as processing functions according to the embodiment of the present invention. The processing units 51 to 56 are all achieved by causing the hardware processor to execute the programs stored in the program storage unit 6.

The position information transmission unit 51 acquires information on the position measured by the position sensor 91 via the input/output I/F 9 and transmits the acquired position information via the communication I/F 8 to the advertisement delivery server SV regularly or when the position changes by a predetermined amount. When the AR display terminals UT1 to UTm each include a motion sensor, the position information transmission unit 51 transmits the direction of the user's line of sight detected with the motion sensor with the direction being contained in the position information described above.

The advertisement delivery information receipt unit 52 receives the advertisement delivery information transmitted from the advertisement delivery server SV via the communication I/F 8 and saves the received advertisement delivery information in the advertisement delivery information storage unit 71 of the data storage unit 7.

The real-life video image acquisition unit 53 activates the camera 92 in response to the receipt of the advertisement delivery information described above and acquires via the input/output I/F 9 data on real world video images captured with the camera 92.

The recognition index extraction unit 54 extracts recognition index from the acquired real-life video image data described above. The extraction of the recognition index is performed, for example, by using what is called a pattern recognition technology in which the recognition index contained in the advertisement delivery information stored in the advertisement delivery information storage unit 71 is used as a reference pattern and the recognition index and the real-life video image data are compared with each other while being shifted and moved relative to each other at a fixed pixel interval.

The advertisement superposition processing unit 55 operates as an augmented reality video image generation unit. The advertisement superposition processing unit 55 generates AR display image data on which an advertisement content read from the advertisement delivery information storage unit 71 described above is superposed, the area where the AR display image data is generated being an area instructed by the recognition index described above in the real-life video image data described above, when the recognition index contained in the advertisement delivery information described above is extracted from the real-life video image data. The advertisement superposition processing unit 55 then outputs the generated AR display image data to the display unit 93 via the input/output I/F 9. The display unit 93 thus displays the AR display image data.

When the display unit 93 described above displays the advertisement content, the viewing information transmission unit 56, for example, counts the number of actions of displaying the advertisement content, generates viewing information containing the count, the user ID, and the advertisement location ID, and transmits the generated viewing information via the communication I/F 8 to the advertisement delivery server SV. The viewing information transmission unit 56 may detect the user's advertisement checking operation in the state in which the advertisement content described above is displayed, for example, the user's clicking operation performed on the input unit 94 or the user's blinking-induced clicking operation and transmit the number of actions of detecting the clicking operation with the number contained in the viewing information.

Action Example

Figure 6:
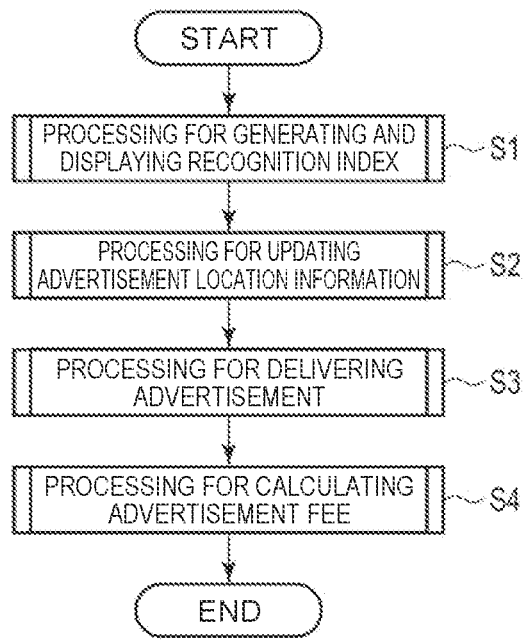
FIG. 6 is a flowchart showing the overall procedure of the action performed by the advertisement delivery server shown in FIGS. 2 and 3.

A description will next be made of an example of the advertisement content AR display action performed by the system configured as described above. FIG. 6 is a flowchart showing the overall procedure of processes carried out by the advertisement delivery server SV out of the action.

Figure 7:
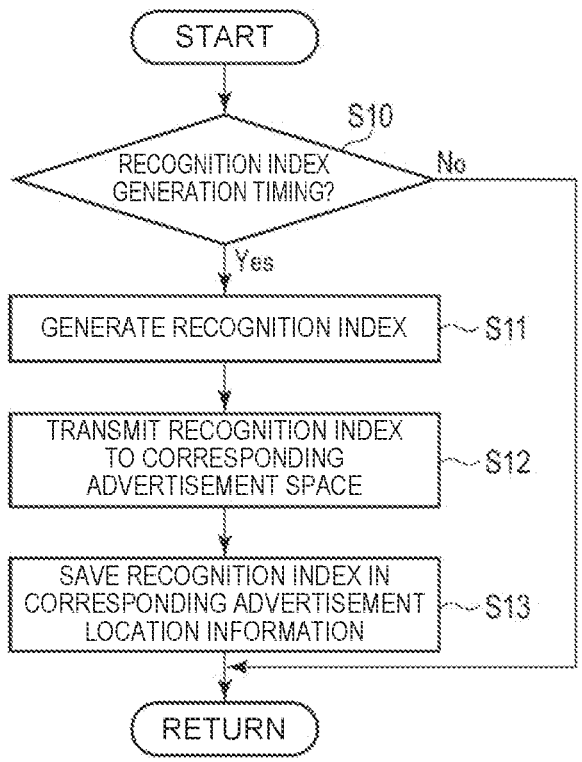
FIG. 7 is a flowchart showing the procedure and contents of generation and display of a recognition index in the flowchart shown in FIG. 6.

It is assumed in the following description that the advertisement delivery server SV stores a plurality of advertisement contents produced by advertisers or advertisement deliverers in the advertisement DB 32 along with information on the attributes of the advertisement contents, and that the user DB 33 stores information on the attributes of users registered as service receiving users along with the user IDs.
(1) Generate and Display Recognition Index In step S1, the advertisement delivery server SV first executes processing for generating and displaying the recognition index for each of the advertisement spaces AD1 to ADn. FIG. 7 is a flowchart showing the procedure and contents of processes of generating and displaying the recognition index.

In step S10, the advertisement delivery server SV monitors the recognition index generation timing under the control of the recognition index generation unit 12. The generation timing is set to be a short period of time, for example, one minute or shorter to prevent scribblings from being made in the advertisement space resulting, for example, from theft of the recognition index. Whenever the generation timing is reached, the recognition index generation unit 12 generates, in step S11 for each of the advertisement spaces AD1 to ADn, a unique recognition index formed, for example, of a two-dimensional barcode that allows recognition of the advertisement space. The recognition index generation unit 12 then transmits each of the generated recognition indices via the communication I/F 4 to the corresponding one of the advertisement spaces AD1 to ADn in step S12.

Figure 12:
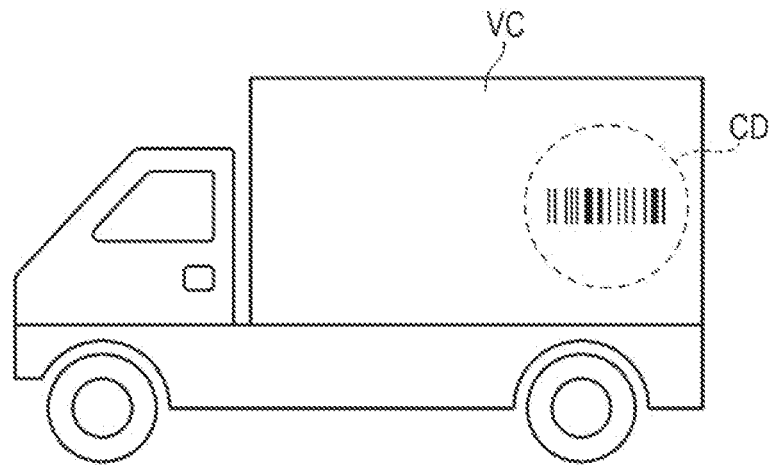
FIG. 12 shows a state in which the recognition index used to recognize the vehicle body of a truck as an advertisement space is displayed on the vehicle body.

In response to this, when the advertisement spaces AD1 to ADn each receive the recognition index addressed thereto, the recognition index is displayed on the display of the advertisement space. A projection device, such as a projector, may be used in place of the display to project the recognition index onto a display target surface. FIG. 12 shows an example of the displayed recognition index in an advertisement space. In this example, a vehicle body side surface VC of a truck is used as the advertisement space, and a recognition index CD formed of a two-dimensional barcode is displayed on the side surface. The same applies to a case where a billboard or any other object is used as the advertisement space.

The advertisement delivery server SV saves the generated recognition index described above in the advertisement location DB under the control of the recognition index generation unit 12 in association with the advertisement location ID of the corresponding one of the advertisement spaces AD1 to ADn in step S13.

Figure 8:
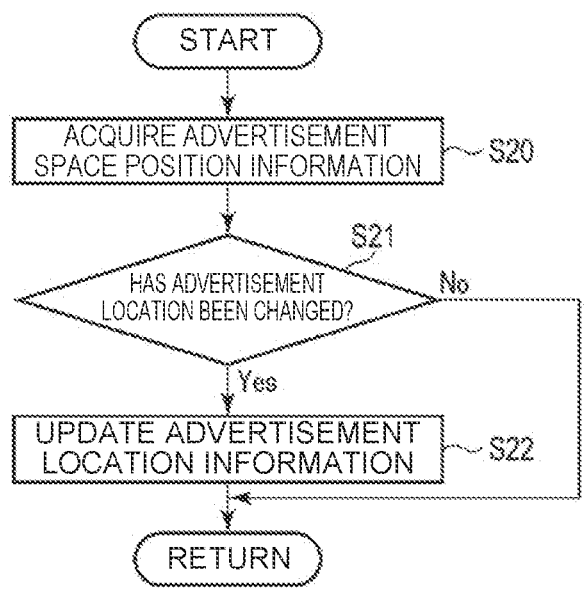
FIG. 8 is a flowchart showing the procedure and contents of an update of advertisement location information in the flowchart shown in FIG. 6.

The recognition index generation unit 12 then repeatedly similarly generates and displays the recognition index for each of the advertisement spaces AD1 to ADn and overwrites and saves the recognition index in the advertisement location DB 31 whenever the generation timing is reached. The generation and display of the recognition index for each of the advertisement spaces AD1 to ADn may be performed simultaneously or separately with a time lag.
(2) Update Advertisement Location Information The advertisement spaces AD1 to ADn are not only installed in fixed positions, such as billboards, but also movable objects, such as truck bodies, as mentioned earlier. In view of the facts described above, the advertisement delivery server SV executes processing for monitoring the current positions of the advertisement spaces AD1 to ADn and updating the advertisement location information in the advertisement location DB 31 in accordance with changes in the positions in step S2. FIG. 8 is a flowchart showing the procedure and contents of processes of updating the advertisement location information.

The advertisement spaces AD1 to ADn measure the positions thereof with the position sensors using GPS or any other technology and transmit information on the measured positions to the advertisement delivery server SV via the network NW regularly or whenever any of the advertisement spaces AD1 to ADn moves by a predetermined distance. Advertisement spaces installed in fixed positions, such as billboards, may not have the function of transmitting the position information. Providing such an advertisement space with the function of measuring and transmitting the position information is, however, useful because when the advertisement space is initially installed or when the advertisement space installation position is changed, the position information can be transmitted from the advertisement space to the advertisement delivery server SV for initial setting or an update in the advertisement location DB 31.

On the other hand, the advertisement delivery server SV receives the position information transmitted from the advertisement spaces AD1 to ADn under the control of the advertisement location information management unit 11 in step S20. Whenever the advertisement delivery server SV receives new position information, the advertisement delivery server SV compares the received position information with the previous position information stored in the advertisement location DB 31 to determine in step S21 whether the corresponding advertisement space has moved by the predetermined distance or longer. As a result of the determination, when the position of any of the advertisement spaces has moved by the predetermined distance or longer, the advertisement location information management unit 11 updates in step S22 the position information contained in the corresponding advertisement location information stored in the advertisement location DB 31.

The advertisement location information management unit 11 may update, whenever the information on the position of an advertisement space is updated, the information on the attributes of the advertisement location based on the updated position information. For example, the advertisement location information management unit 11 accesses map information database held by the advertisement delivery server or a map information providing website to determine the characteristics of the area corresponding to the updated position information described above. The advertisement location information management unit 11 then determines, for example, whether the current location of the advertisement space falls within a commercial area or a residential area, and when the current location falls within a commercial area, the advertisement location information management unit 11 determines whether or not the current location falls within an area where many young people gather. The advertisement location information management unit 11 then updates the information on the attributes of the advertisement location based on the result of the determination.

(3) Deliver Advertisement Content

Figure 9:
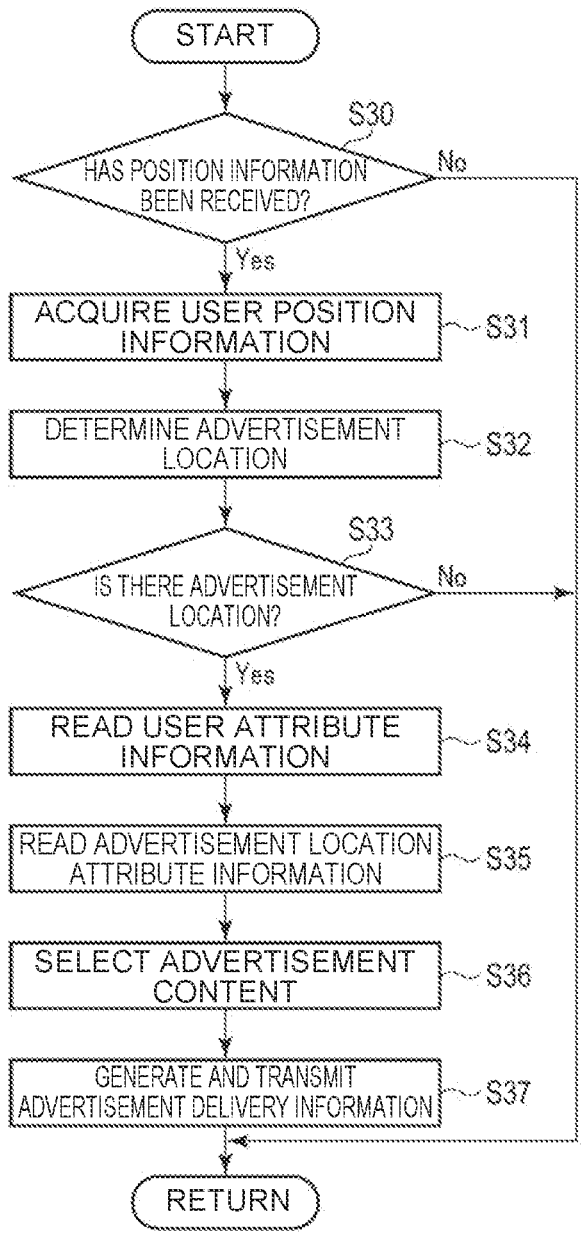
FIG. 9 is a flowchart showing the procedure and contents of processes of delivering an advertisement in the flowchart shown in FIG. 6.
Figure 11:
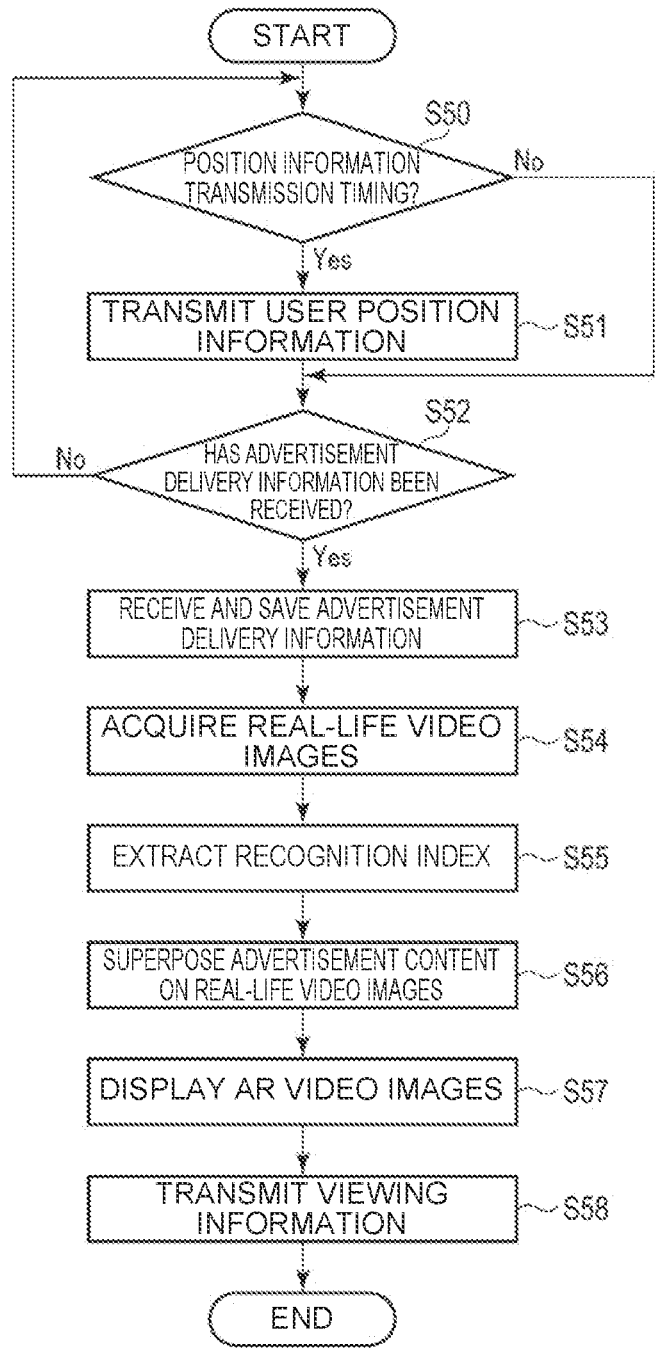
FIG. 11 is a flowchart showing the procedure and contents of processes carried out by the AR display terminal shown in FIGS. 4 and 5.

The advertisement delivery server SV delivers an advertisement content in step S3 as will be described below. FIG. 9 is a flowchart showing the procedure and contents of processes of delivering an advertisement content. The AR display terminals UT1 to UTm, which are held by the users, each executes processing for displaying the advertisement content delivered from the advertisement delivery server SV described above as will be described below. FIG. 11 is a flowchart showing the procedure and contents of processes of displaying the advertisement content.

The AR display terminals UT1 to UTm each monitor the position information transmission timing in step S50 under the control of the position information transmission unit 51. In this state, when a predetermined period has elapsed since the last position information transmission timing of any of the AR display terminals UT1 to UTm, or when any of the AR display terminals UT1 to UTm has moved by the predetermined distance or longer from the last measured position, the position information transmission unit 51 transmits in step S51 information on the current position measured by the position sensor 91 via the communication I/F 8 to the advertisement delivery server SV. The position information described above contains identification information used to identify the corresponding one of the AR display terminals UT1 to UTm, that is, the user ID.

On the other hand, the advertisement delivery server SV monitors receipt of the position information transmitted from any of the AR display terminals UT1 to UTm in step S30 under the control of the advertisement location determination unit 13. In this state, for example, when the advertisement delivery server SV receiving the position information of the AR display terminal UT1, the advertisement delivery server SV retrieves the user ID and the current position contained in the position information in step S31 and determines whether or not there is an advertisement space that can be viewed on the AR display terminal UT1 of the user in step S32.

An approach for determining whether or not there is an advertisement space includes, for example, calculating the distance between the received user's position and the position of each of the advertisement spaces AD1 to ADn stored in the advertisement location DB 31 and selecting an advertisement space separate from the user's position by the calculated distance smaller than a threshold. Another determination approach is conceivable as follows: When the information on the attributes of each of the advertisement spaces AD1 to ADn stored in the advertisement location DB 31 contains the area of the advertisement display surface, the distance that allows the AR display terminal UTm to be viewed is calculated in accordance with the area of the advertisement display surface, and an advertisement space separate from the AR display terminal UTm by the calculated distance smaller than or equal to the threshold is selected.

Furthermore, when the information on the attributes of each of the advertisement spaces AD1 to ADn stored in the advertisement location DB 31 contains the orientation of the display surface, an advertisement space may be selected in consideration of the orientation of the display surface. When the information on the attributes of each of the advertisement spaces AD1 to ADn contains map data representing a constructed building distribution state and geographical features, the advertisement delivery server SV may determine based on the map data whether or not buildings, hills, or other obstructions that block the view from the AR display terminal UTm are present around any of the advertisement spaces AD1 to ADn, and when obstructions are present, the advertisement space may be excluded from the advertisement display targets. Therefore, when the orientation of the display surface of any of the advertisement spaces AD1 to ADn deviates from the line of sight to the AR display terminal UTm, or when there are obstructions between the advertisement space and the AR display terminal, the advertisement space can be excluded from the advertisement display targets even though the distance between the advertisement space and the AR display terminal is short.

When the advertisement delivery server SV ascertains in step S33 that an advertisement space that can be viewed on the AR display terminal UTm has been found through the advertisement location determination described above, the advertisement delivery server SV delivers the advertisement as follows under the control of the advertisement delivery processing unit 14.

That is, the advertisement delivery processing unit 14 reads the user attribute information corresponding to the AR display terminal UTm described above from the user DB 33 in step S34 and further reads the information on the attributes of the advertisement space selected as the advertisement delivery destination described above from the advertisement location DB 31 in step S35. The advertisement delivery processing unit 14 then searches for an advertisement content that matches the user and advertisement space described above from the advertisement DB 32 in step S36 based on the read user attribute information and advertisement space attribute information described above.

For example, the advertisement delivery processing unit 14 first refers to the user attribute information to select from the advertisement DB 32 a plurality of advertisement contents corresponding to the user's gender, age, hobbies, and interests as first candidates. The advertisement delivery processing unit 14 then selects as a second candidate, on an advertisement space basis and based on the information on the attribute thereof, a corresponding advertisement content from the first candidates described above in accordance with whether or not the current position of the advertisement space falls within, for example, a commercial area, and when the current position falls within a commercial area, whether or not the current position falls within a commercial area for young people. The second candidate may be selected in consideration of the season and time of day.

When there are a plurality of second candidates for the selected advertisement content described above, a most frequently selected advertisement content, for example, is selected from the plurality of advertisement contents. In this case, a least frequently selected advertisement content may instead be selected, or any of the plurality of second candidates may instead be randomly selected. Still instead, a plurality of advertisement contents may be selected sequentially in a time division manner at predetermined time intervals.

When an advertisement content to be delivered is selected as described above, the advertisement delivery processing unit 14 reads the advertisement location ID and the corresponding recognition index of the aforementioned advertisement space to be delivered from the advertisement location DB 31 in step S37. The advertisement delivery processing unit 14 then generates advertisement delivery information containing the read advertisement location ID and recognition index and the selected advertisement content described above. Furthermore, the advertisement delivery processing unit 14 transmits the generated advertisement delivery information via the communication I/F 4 toward the AR display terminal UTm.

When a plurality of users are in company with one another in the advertisement delivery described above, it is desirable to select and deliver the same advertisement content to the plurality of users. The advertisement delivery processing unit 14 therefore determines whether or not a plurality of users to which an advertisement is delivered are in company with one another.

To determine whether or not users are in company with one another, for example, the users in company with one another may be explicitly paired with the respective AR display terminals and the user attribute information containing the pairing information may be registered in the user DB 33. Instead, the company may be determined by the fact that the positions of the AR display terminals of the plurality of users fall within a fixed distance range for a fixed period of time or over a fixed travel distance.

In this case, when the position information acquired, for example, with a GPS sensor has a large error, the accuracy of the determination decreases. Therefore, to prevent a decrease in the determination accuracy, it is recommended that the proximity of the terminals to each other be determined by causing the AR display terminals to transmit and receive any of the following signals: a radio wave, light, audible and inaudible sounds, and when the proximity continues for a fixed period of time or over a fixed distance, the terminals are determined to be in company with one another.

On the other hand, the AR display terminal UTm monitors receipt of the advertisement delivery information in step S52 under the control of the advertisement delivery information receipt unit 52. In this state, when the advertisement delivery information addressed to the AR display terminal UTm is received, the AR display terminal UTm saves the received advertisement delivery information in the advertisement delivery information storage unit 71 in step S53.

The AR display terminal UTm then activates the camera 92 in step S54 and captures video image data captured in front of the AR display terminal UTm with the camera 92 via the input/output I/F 9 under the control of the real-life video image acquisition unit 53. An image of the recognition index is then extracted from the captured video image data described above and the code of the recognition index is recognized in step S55 under the control of the recognition index extraction unit 54. The extraction and recognition of recognition index can be performed by using a general-purpose barcode reader (application).

Figure 13:
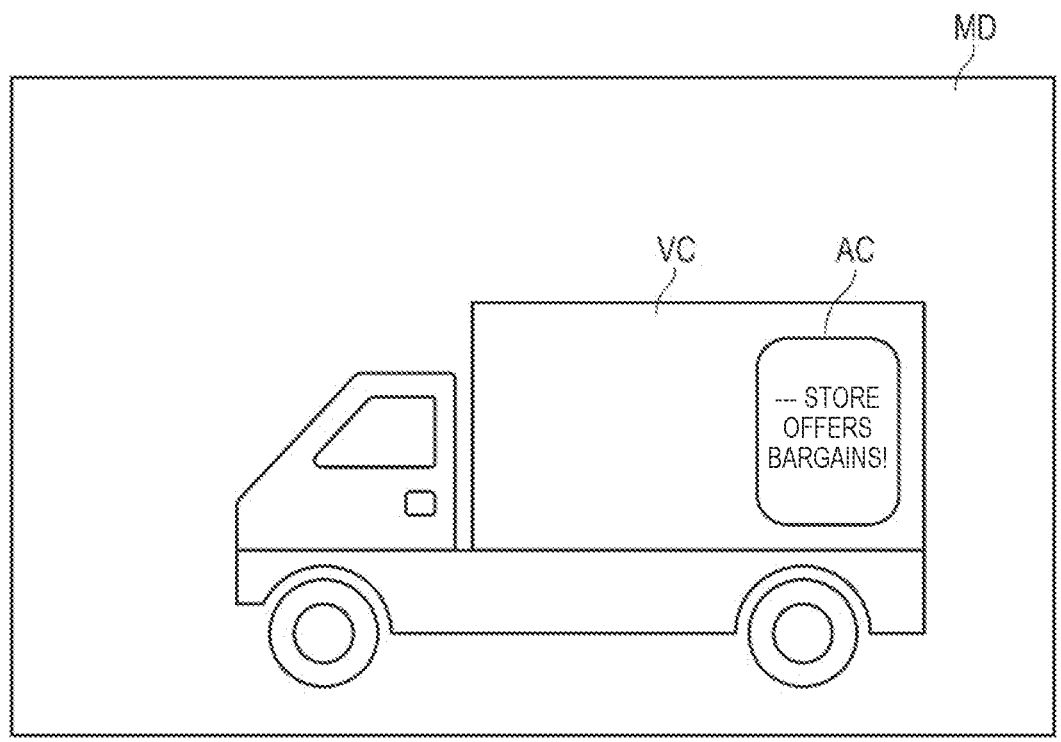
FIG. 13 shows an example of an advertisement displayed in the display space shown in FIG. 12.

The AR display terminal UTm subsequently reads the advertisement delivery information saved in the advertisement delivery information storage unit 71 in step S56 and compares the recognition index contained in the advertisement delivery information with the recognized recognition index described above under the control of the advertisement superposition processing unit 55. When the two recognition indices coincide with each other, an image or video images of the advertisement content contained in the advertisement delivery information described above are superposed on an area of the real-life video images described above that is the area where the recognition index described above is extracted, and the real-life video images on which the advertisement content has been superposed, that is, AR video images are output to and displayed on the display unit 93 via the input/output interface 9 in step S57. FIG. 13 shows an example of an advertisement content image AC displayed on the vehicle body side surface VC of the truck in real-life video images.

When an advertisement content contains voice data, the AR display terminal UTm decodes the voice data described above and outputs the decoded voice from a loudspeaker or an earphone that is not shown in synchronization with the action of displaying an image of the advertisement content described above.

(4) Calculate Advertisement Fee

When the advertisement content described above is displayed, the AR display terminal UTm determines whether or not the user has checked the content described above in step S58 under the control of the viewing information transmission unit 56. The determination is performed based, for example, on the user's click operation performed on the input unit 94. Instead, for example, a camera may detect the user's blinking action as the click operation described above. Instead of detecting the user's click operation, the number of viewing actions may be counted up based on the fact that the advertisement content has been displayed continuously for a fixed period of time or longer.

The viewing information transmission unit 56 of the AR display terminal UTm generates viewing information containing the ID of the displayed advertisement content described above, the ID (advertisement location ID) or recognition index of the display-destination advertisement space, and the aforementioned counted number of clicks or viewing actions and transmits the viewing information via the communication I/F 8 to the advertisement delivery server SV.

Figure 10:
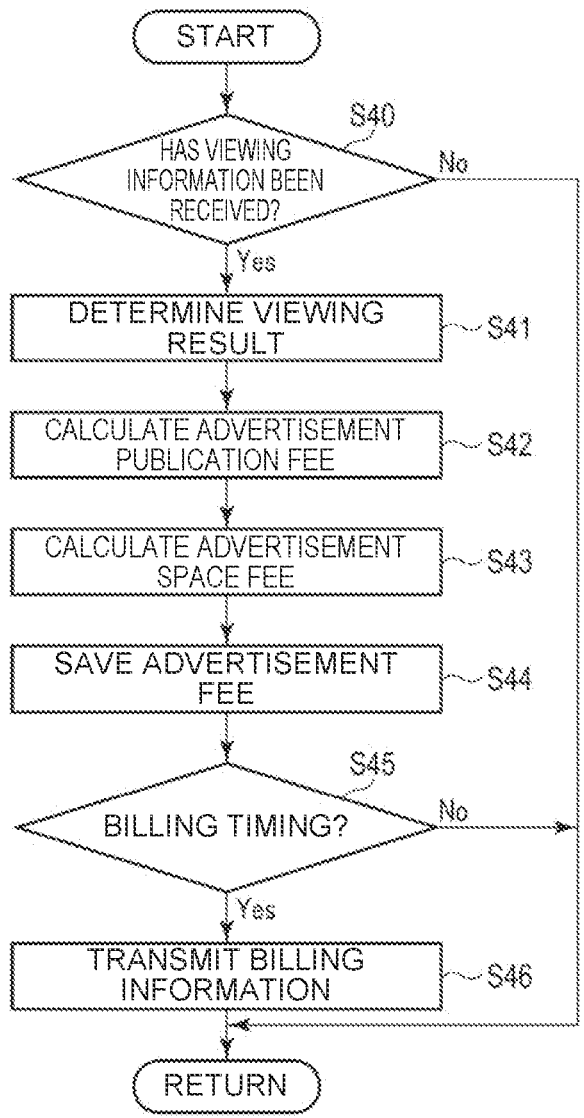
FIG. 10 is a flowchart showing the procedure and contents of processes of calculating an advertisement fee shown in FIG. 6.

On the other hand, the advertisement delivery server SV executes processing for calculating an advertisement fee in step S4, as described below. FIG. 10 is a flowchart showing the procedure and contents of processes of calculating the advertisement fee.

That is, when the advertisement delivery server SV first receives the viewing information from AR display terminals UT1 to UTm in step S40 under the control of the advertisement viewing determination unit 15, the advertisement delivery server SV determines the viewing results, that is, the number of clicks or viewing actions based on the received viewing information in step S41.

The advertisement delivery server SV then calculates, in step S42 under the control of the advertisement publication fee calculation unit 16, the total number of viewing actions or clicks, for example, on an advertisement content basis based on the viewing information determination result sent from each of the AR display terminals UT1 to UTm and further calculates the advertisement publication fee to be charged to an advertiser or an advertisement deliverer of the advertisement content described above based on the result of the calculation.

The advertisement delivery server SV, for each of the advertisement spaces AD1 to ADn serving as the advertisement display destination, calculates the total number of viewing actions or clicks for the advertisement content displayed in the advertisement space based on the viewing information described above and further calculates based on the result of the calculation the advertisement space fee to be paid as an advertisement location supply fee to the corresponding one of the advertisement spaces AD1 to ADn described above in step S43 under the control of the advertisement space fee calculation unit 17.

The advertisement delivery server SV then stores the calculated advertisement publication fee and advertisement space fee described above in the advertisement fee DB 34 in association with the identification information used to identify the advertiser or advertisement deliverer and the ID of the advertisement space in step S44.

The advertisement delivery server SV monitors the billing timing in step S45 under the control of the billing processing unit 18. For example, on a designated monthly billing date, the advertisement delivery server SV generates the billing information for each advertiser or advertisement deliverer and transmits the billing information to a designated billing destination terminal in step S46. The advertisement delivery server SV also generates an advertisement fee payment information on an advertisement space basis to the owner of the advertisement space and transmits the information to a designated terminal.

The advertisement delivery server SV may determine whether or not the advertisement publication fee calculated in step S42 has reached a budget set in advance on an advertisement content or advertiser basis, and when the budget has been reached, the advertisement delivery server SV may suspend the delivery of the advertisement or all advertisements from the advertiser until the next billing timing.

Effects and Advantages

As described above in detail, the embodiment according to the present invention provides the following effects and advantages:

(1) The advertisement delivery server SV, for each of the advertisement spaces AD1 to ADn, generates a recognition index used to recognize the advertisement space, displays the recognition index in the advertisement space, and stores the recognition index in the advertisement location DB 31. In this state, the advertisement delivery server SV acquires the information on the positions of the AR display terminals UT1 to UTm held by the users, selects the advertisement spaces AD1 to ADn that can be viewed via the AR display terminals UT1 to UTm based on the position information and the information on the positions of the advertisement spaces AD1 to ADn described above, and transmits the recognition indices and advertisement contents corresponding to the selected advertisement spaces to the AR display terminals UT1 to UTm. In response to the above, the AR display terminals UT1 to UTm each extract the recognition index from real-life images captured with the camera 92, generate AR video images by superposing the advertisement content described above in the area corresponding to the extracted recognition index in the real-life video images, and display the AR video images on the display unit 93.

Therefore, when the advertisement space enters the field of view of the user's AR display terminal, the advertisement content is delivered to the AR display terminal along with the recognition index corresponding to the advertisement space described above, whereby the AR display terminal can display the AR video images in which the advertisement content described above is superposed on real-life video images containing the advertisement space described above as a background.

(2) In the advertisement content selection, advertisement contents suitable for the users and the locations of the advertisement spaces are selected based on the information on the attributes of the AR display terminals UT1 to UTm and the information on the attributes of the advertisement spaces AD1 to ADn stored in the advertisement location DB 31 and user DB 33, respectively. Advertisement contents that highly match the users and can be expected to provide large advertisement effects can therefore be delivered.

(3) The advertisement delivery server SV collects and manages the information on the positions of advertisement spaces AD1 to ADn regularly or whenever any of the advertisement spaces moves by the predetermined distance. Therefore, even when any of the advertisement spaces AD1 to ADn is a moving object, such as a truck, the latest position of the corresponding one of the 4 advertisement spaces AD1 to ADn can be managed, whereby the advertisement space serving as an advertisement display target can be accurately selected.

(4) In the advertisement content selection, whether or not a plurality of users are in company with one another is determined, and if a plurality of users are in company with one another, the same advertisement content is delivered to the AR display terminals of the users. The users in company with one another can thus share the same advertisement content.

(5) The AR display terminals UT1 to UTm each calculate the number of actions of viewing displayed advertisement content or the number of clicks representing the user's reaction to the displayed advertisement and send the calculated number as the viewing information to the advertisement delivery server SV. The advertisement delivery server SV calculates the total number of viewing actions or clicks on an advertisement content basis based on the advertisement viewing information described above and further calculates the advertisement publication fee to be charged to the advertiser or the advertisement deliverer of the advertisement content described above content based on the result of the calculation. A reasonable advertisement publication fee can therefore be calculated and charged on an advertisement content basis based on the actual delivery of or the user response to the advertisement content.

(6) Based on the viewing information described above sent from the AR display terminals UT1 to UTm and for each of the advertisement spaces AD1 to ADn, the advertisement location supply fee (advertisement space fee) for the corresponding one of the advertisement spaces AD1 to ADn is calculated by summing the number of actions of delivering the advertisement or the number of clicks representing the user's response. A reasonable advertisement location supply fee can thus be calculated and paid for each of the advertisement spaces AD1 to ADn based on the actual advertisement delivery or the user response.

(7) The advertisement delivery server SV is configured to change the recognition index displayed in each of the advertisement spaces AD1 to ADn in a cycle of, for example, one minute or shorter. Scribblings and other undesirable behaviors made on the advertisement spaces due, for example, to theft of the recognition indices can therefore be suppressed.

Other Embodiments (1) The embodiment has been described with reference to the case where unique recognition indices are generated for the respective advertisement spaces AD1 to ADn and the recognition indices are used to allow different advertisement contents to be superposed for each of the advertisement spaces on real-life video images containing the advertisement contents. However, the present invention is not limited to the case described above, and a common recognition index can be generated for the advertisement spaces AD1 to ADn and displayed as an AR marker. In this way, when a plurality of advertisement spaces fall within the fields of view of the AR display terminals UT1 to UTm, the same advertisement content can be superposed in a position in each of the advertisement spaces described above in real-life video images.

When content video images that are also meaningful to passersby who do not use the AR display terminals UT1 to UTm are displayed in the advertisement spaces, it is also preferable to extract an image local feature represented by SIFT or SURF from a still image on a frame basis that forms the content video images and use the local feature as the recognition index. When it is not necessary to take measures against scribblings made to content video image, it is acceptable to present a still image in any of the advertisement spaces and use an image local feature of the still image as the recognition index.

(2) A user may pay a fee to cause non-advertisement video images that meet the user's preference to be superposed on real world video images containing an advertisement space where an advertisement content is superposed and displayed. In this way, users who do not like advertisement display can use the advertisement delivery system to which the augmented reality technology is applied in another application with the configuration of the advertisement delivery system maintained.

(3) Out of the variety of control functions of the advertisement delivery server SV, a desired function, for example, the functions of the advertisement location determination unit 13 and the advertisement delivery processing unit 14 may be provided in each of the AR display terminals UT1 to UTm. The determination of the advertisement locations and the advertisement content selection can thus be performed by the AR display terminals UT1 to UTm in a distributed manner, whereby the processing load on the advertisement delivery server SV can be reduced.

(4) The embodiment has been described with reference to the case where a head mounted display is used as each of the AR display terminals and provided with all the functions of the AR display terminal, but not necessarily. The AR display terminals may each be formed, for example, of glasses including a display unit capable of displaying AR video images and a portable information terminal, such as a smartphone. In this way, the series of processes of displaying an advertisement content on the glasses described above can be carried out by simply installing an AR display control performing application on an existing mobile information terminal, whereby inexpensive glasses can be used.

(5) The embodiment has been described with reference to the case in which an advertisement is delivered, and the present invention is also applicable to delivery of a variety of types of notification information other than advertisements, for example, disaster information and news. In addition to the above, the type and configuration of the notification space, the type and configuration of the delivery control device and the augmented reality display terminals, and the procedure and contents of the processes of delivering the notification information can be implemented in a variety of different ways without departing from the substance of the present invention.

That is, the invention of the present application is not limited to the embodiment described above, and the embodiment can be changed in a variety of manners when implemented to the extent that the changes do not depart from the substance of the present invention. The embodiments may be combined with each other as appropriate whenever possible. In this case, a combined effect can be achieved. Furthermore, the embodiment described above contains inventions in a variety of stages, and a variety of inventions are extractable from appropriate combinations of the plurality of disclosed constituent requirements.

REFERENCE SIGNS LIST

SV Advertisement delivery server
AD1 to ADn Advertisement space
UT1 to UTm AR display terminal
NW Network
1, 5 Control unit
2, 6 Program storage unit
3, 7 Data storage unit
4, 8 Communication interface (communication I/F)
9 Input/output interface (input/output I/F)
11 Advertisement location information management unit
12 Recognition index generation unit
13 Advertisement location determination unit
14 Advertisement delivery processing unit
15 Advertisement viewing determination unit
16 Advertisement publication fee calculation unit
17 Advertisement space fee calculation unit
18 Billing processing unit
31 Advertisement location database (advertisement location DB)
32 Advertisement database (advertisement DB)
33 User database (user DB)
34 Advertisement fee database (advertisement fee DB)
51 Position information transmission unit
52 Advertisement delivery information receipt unit
53 Real-life video image acquisition unit
54 Recognition index extraction unit
55 Advertisement superposition processing unit
56 Viewing information transmission unit
71 Advertisement delivery information storage unit
91 Position sensor
92 Camera
93 Display unit
94 Input unit

The invention claimed is:

1. An augmented reality notification information delivery system comprising:
an augmented reality display terminal held by a user; and
a delivery control device capable of communicating with at least the augmented reality display terminal, wherein the delivery control device includes
a storage medium that stores management information containing at least information on a position of a notification space where a recognition index representing a notification information display target portion is displayed and index information representing the recognition index,
a determination unit that determines, based on information on a position of the augmented reality display terminal and the notification space position information contained in the management information, whether or not the augmented reality display terminal is so located that the notification space falls within a field of view of the augmented reality display terminal, and
a transmission unit that transmits delivery information containing the notification information and the index information contained in the management information to the augmented reality display terminal with the augmented reality display terminal being determined to be so located that the notification space falls within the field of view of the augmented reality display terminal,
the augmented reality display terminal includes
an acquisition unit that acquires video images of a real world that falls within the field of view of the augmented reality display terminal,
a receipt unit that receives the delivery information transmitted from the delivery control device,
an extraction unit that extracts the recognition index corresponding to the index information contained in the received delivery information from the acquired real world video images, and
an augmented reality video image generation unit that displays the notification information contained in the delivery information on a display unit of the augmented reality display terminal in such a way that the notification information is superposed in a position where the recognition index in the acquired real world video images is extracted.

2. A delivery control device capable of communicating with an augmented reality display terminal that extracts a recognition index representing a notification space display target portion from real world video images and superposes and displays delivered notification information in a position of the extracted recognition index in the real world video images, the delivery control device comprising:
a storage medium that stores management information containing at least information on a position of the notification space and index information representing the recognition index;
a processor, wherein the storage medium having computer program instructions stored thereon, when executed by the processor, perform to:
determines, based on information on a position of the augmented reality display terminal and the notification space position information contained in the management information, whether or not the augmented reality display terminal is so located that the notification space falls within a field of view of the augmented reality display terminal; and
transmits delivery information containing the notification information and the index information contained in the management information to the augmented reality display terminal with the augmented reality display terminal being determined to be so located that the notification space falls within the field of view of the augmented reality display terminal.

3. The delivery control device according to claim 2, wherein the computer program instructions further perform to collects the information on the position of the notification space regularly or at an arbitrary timing and updates the position information contained in the management information to the collected position information.

4. The delivery control device according to claim 2, wherein the computer program instructions further perform to acquires at least one of first attribute information representing characteristics of a user who holds the augmented reality display terminal and second attribute information representing characteristics of the notification space and selects, as the notification information, information that matches at least one of the characteristics of the user and the characteristics of the notification space based on at least one of the acquired first attribute information and second attribute information.

5. The delivery control device according to claim 2, wherein the computer program instructions further perform to determines, when the augmented reality display terminal is formed of a plurality of augmented reality display terminal, whether or not a mutual positional relationship among the plurality of augmented reality display terminals is maintained within a predetermined distance for a predetermined period of time or longer, and when the positional relationship is determined to be maintained, selects the same notification information for the plurality of augmented reality display terminals.

6. The delivery control device according to claim 2, wherein the computer program instructions further perform to acquires viewing information from the augmented reality display terminal, the viewing information containing a result of operation of displaying the notification information or a result of reaction of a user of the augmented reality display terminal to the notification information, and calculates a notification information delivery fee for a deliverer of the notification information based on the acquired viewing information.

7. The delivery control device according to claim 2, wherein the computer program instructions further perform to acquires viewing information from the augmented reality display terminal, the viewing information containing a result of operation of displaying the notification information or a result of reaction of a user of the augmented reality display terminal to the notification information, and calculates a notification location supply fee for supplying the notification space based on the acquired viewing information.

8. The delivery control device according to claim 2, wherein the computer program instructions further perform to generates the recognition index that changes every predetermined period of time, transmits the index information representing the recognition index to the notification space whenever the recognition index is generated to update the displayed recognition index, and further updates the index information contained in the management information to the index information representing the generated recognition index.

9. A non-transitory computer-readable medium having computer-executable instructions that, upon execution of the instructions by a processor of a computer, cause the computer to function as the delivery control device according to claim 2.

10. An augmented reality notification information delivery method performed by a system including an augmented reality display terminal held by a user and a delivery control device capable of communicating with at least the augmented reality display terminal, the method comprising:

causing the delivery control device to store management information in a storage medium, the management information containing at least information on a position of a notification space where a recognition index representing a notification information display target portion is displayed and index information representing the recognition index;

causing the delivery control device to determine, based on information on a position of the augmented reality display terminal and the notification space position information contained in the management information, whether or not the augmented reality display terminal is so located that the notification space falls within a field of view of the augmented reality display terminal;

causing the delivery control device to transmit delivery information containing the notification information and the index information contained in the management information to the augmented reality display terminal with the augmented reality display terminal being determined to be so located that the notification space falls within the field of view of the augmented reality display terminal;

causing the augmented reality display terminal to acquire video images of a real world that falls within the field of view of the augmented reality display terminal;

causing the augmented reality display terminal to receive the delivery information transmitted from the delivery control device;

causing the augmented reality display terminal to extract the recognition index corresponding to the index information contained in the received delivery information from the acquired real world video images; and causing the augmented reality display terminal to display the notification information contained in the delivery information on a display unit of the augmented reality display terminal in such a way that the notification information is superposed in a position where the recognition index in the acquired real world video images is extracted.

11. The augmented reality notification information delivery method of claim 10 further comprises collecting the information on the position of the notification space regularly or at an arbitrary timing and updates the position information contained in the management information to the collected position information.

12. The augmented reality notification information delivery method of claim 10 further comprises acquiring at least one of first attribute information representing characteristics of a user who holds the augmented reality display terminal and second attribute information representing characteristics of the notification space and selecting, as the notification information, information that matches at least one of the characteristics of the user and the characteristics of the notification space based on at least one of the acquired first attribute information and second attribute information.

13. The augmented reality notification information delivery method of claim 10 further comprises determining, when the augmented reality display terminal is formed of a plurality of augmented reality display terminal, whether or not a mutual positional relationship among the plurality of augmented reality display terminals is maintained within a predetermined distance for a predetermined period of time or longer, and when the positional relationship is determined to be maintained, selecting the same notification information for the plurality of augmented reality display terminals.

14. The augmented reality notification information delivery method of claim 10 further comprises acquiring viewing information from the augmented reality display terminal, the viewing information containing a result of operation of displaying the notification information or a result of reaction of a user of the augmented reality display terminal to the notification information, and calculating a notification information delivery fee for a deliverer of the notification information based on the acquired viewing information.

15. The augmented reality notification information delivery method of claim 10 further comprises acquiring viewing information from the augmented reality display terminal, the viewing information containing a result of operation of displaying the notification information or a result of reaction of a user of the augmented reality display terminal to the notification information, and calculating a notification location supply fee for supplying the notification space based on the acquired viewing information.

16. The augmented reality notification information delivery method of claim 10 further comprises generating the recognition index that changes every predetermined period of time, transmits the index information representing the recognition index to the notification space whenever the recognition index is generated to update the displayed recognition index, and further updating the index information contained in the management information to the index information representing the generated recognition index.

* * * * *